Inventors
E. P. G. WRIGHT
D. A. WEIR
J. RICE
By Robert Harding Jr.
Attorney

Inventors
E. P. G. WRIGHT
D. A. WEIR
J. RICE
By [signature]
Attorney

Inventors
E. P. G. WRIGHT
D. A. WEIR
J. RICE
By Robert Harding Jr.
Attorney

July 21, 1959 E. P. G. WRIGHT ET AL 2,896,019

TELECOMMUNICATION EQUIPMENT

Filed June 30, 1954 4 Sheets-Sheet 4

Inventors
E. P. G. WRIGHT-
D. A. WEIR-
J. RICE
By Robert Harding Jr.
Attorney

United States Patent Office 2,896,019 Patented July 21, 1959

2,896,019

TELECOMMUNICATION EQUIPMENT

Esmond Philip Goodwin Wright, Donald Adams Weir, and Joseph Rice, London, England, assignors to International Standard Electric Corporation, New York, N.Y.

Application June 30, 1954, Serial No. 440,424

Claims priority, application Great Britain July 7, 1953

11 Claims. (Cl. 178—17.5)

The present invention relates to telecommunication equipment employing intelligence storage equipment.

According to the present invention there is provided apparatus for measuring a succession of time intervals, comprising a storage device moving past recording and reading devices in turn at a substantially uniform speed, and wherein a recording device initially inserts a mark in said storage device, whereafter said reading device detects said mark and both produces a time signal and causes a recording device to record a further mark, said reading and re-recording continuing until a desired number of time intervals have been measured.

According to the present invention there is further provided apparatus for measuring a succession of time intervals for any one of a number of users, comprising a storage device moving past recording and reading devices in turn at a substantially uniform speed, said storage device providing a number of storage sections each of which is allocated to one of said users, and wherein when one of said users requires said measurement, a mark is inserted in a storage section allocated thereto, whereafter when said reading device detects a mark, a time signal is produced for the user in whose storage section that mark was recorded and a further mark is recorded by a recording device in a storage section allocated to the same user, said reading and re-recording continuing for a user until a desired number of time intervals therefor have been measured, the arrangement being such that the measurement of a succession of time intervals can be in progress for any one or more users at once.

Figure 1:
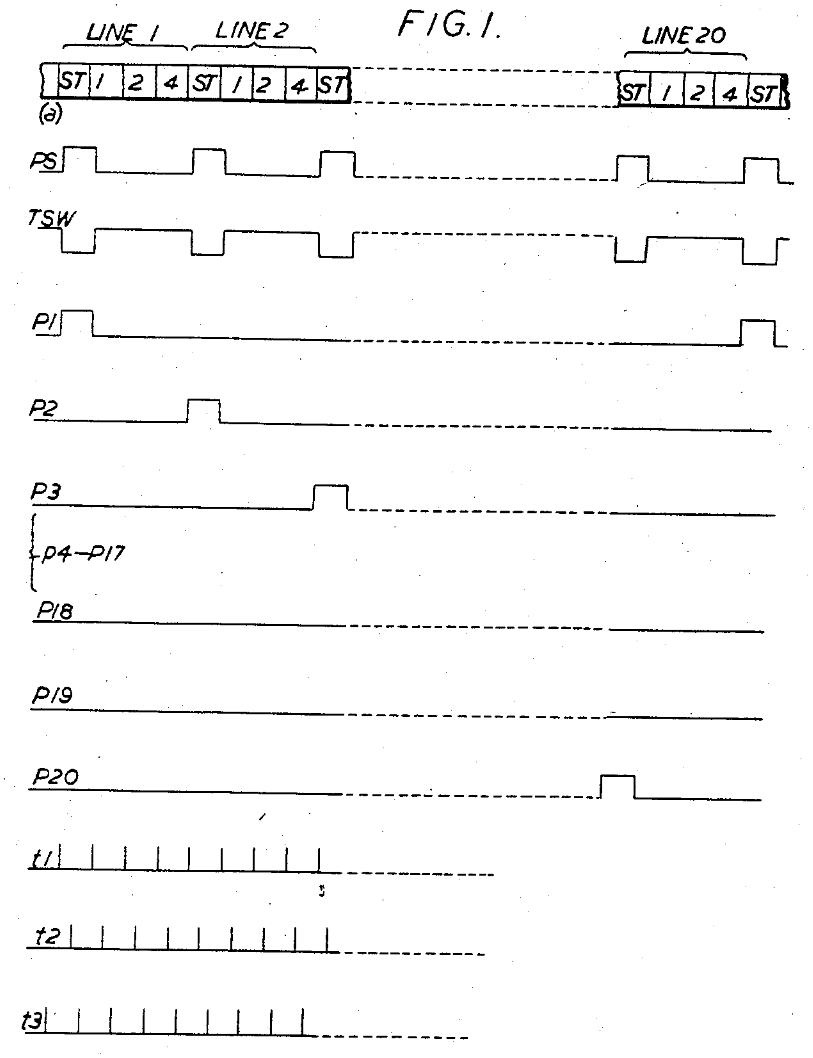

The invention will now be described with reference to the accompanying drawings, in which:

Fig. 1 is a schematic diagram which shows how element positions on a magnetic track on the periphery of a rotatable magnetic drum are used to provide a number of timing devices, and also shows a number of the waveforms employed in the circuits to be described.

Figure 2:
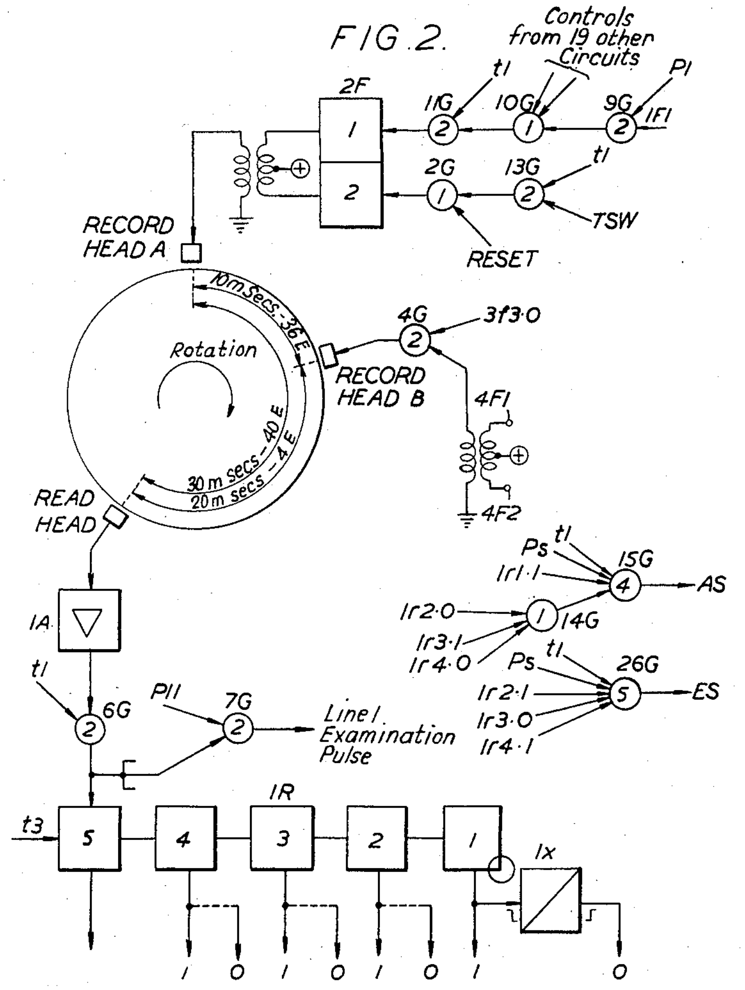
Figure 3:
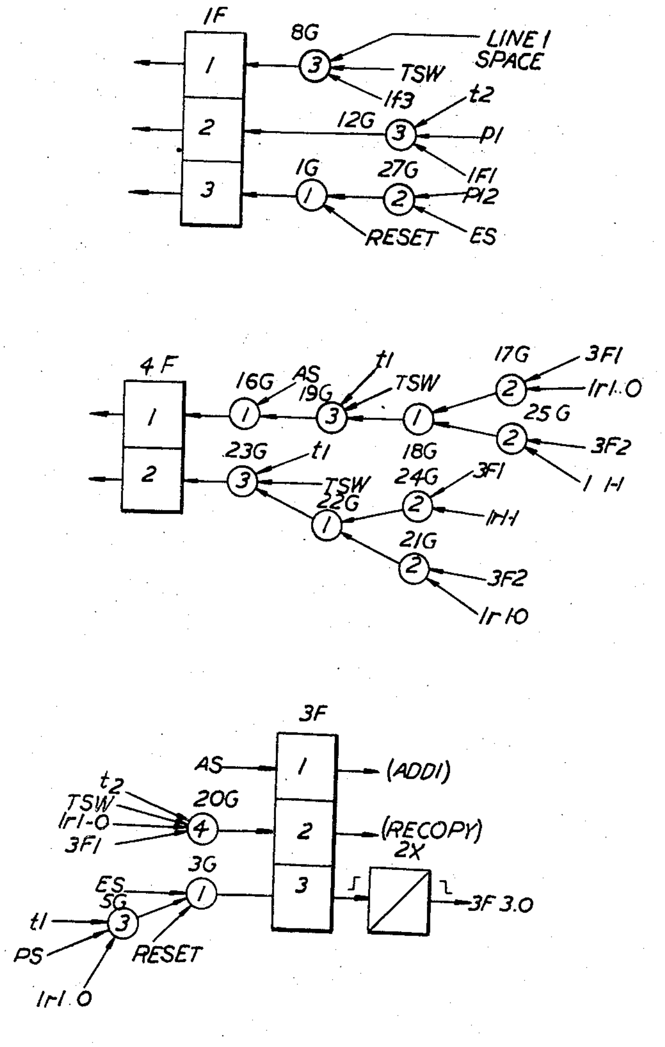

Figs. 2 and 3 taken together show schematically an embodiment of the invention in which a single peripheral magnetic track on a rotatable drum provides time scales for a number of independent telegraph channels.

Figure 4:
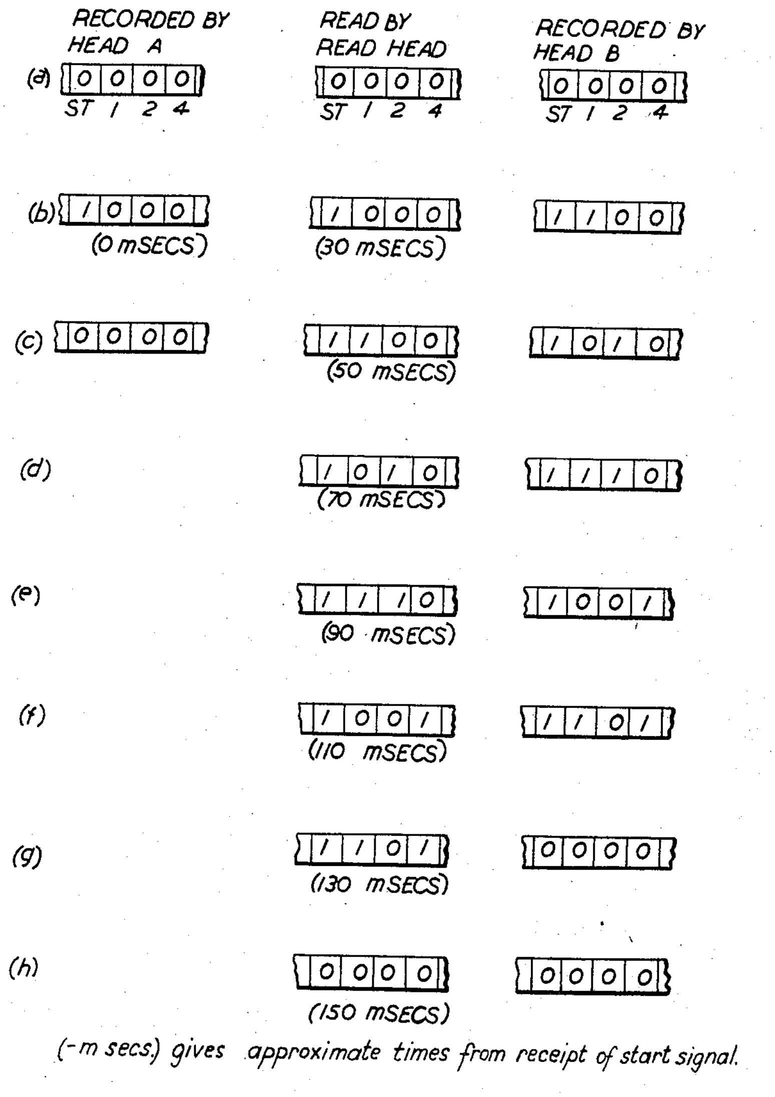

Fig. 4 illustrates schematically the condition of the element positions of a single time scale at different intervals during reception of a single character.

*General description*

The equipment embodying the invention which is described and shown is intended for use in a telegraph regenerator having twenty incoming lines. Received messages are stored on peripheral magnetic tracks on a rotatable drum. The characters are received at the normal telegraph speed of 50 bauds, i.e. each element of a character lasts for 20 milliseconds, and each character consists of a start element, five permutable elements, and a stop element.

A single track on the drum is used to provide the time scales which control the production of examining pulses for characters received on a number of incoming channels served by the equipment. For convenience of explanation, certain figures will be referred to. Since a normal telegraph character has five permutable elements, five examining pulses must be provided. These should occur at 30, 50, 70, 90 and 110 milliseconds from the commencement of the start character. The drum used in this system has a capacity of 1600 intelligence elements per track, and rotates at 1200 r.p.m., that is, at 50 milliseconds per revolution. It is used to control the production of examining pulses for 20 channels.

To provide the necessary examining pulses the track is subdivided into a number of storage sections each of which has a capacity of 4 intelligence elements, the first being used to record an indication whether or not a character is being received from that line, i.e. performing a "chalk-mark" function, and the others being used to count in binary notation the pulses produced.

The system uses two record heads and one read head. When a character is received, the first record head places a 1 recording in the "chalk-mark" element position for the first storage section assigned to the line on which that character is received. After 30 milliseconds, this "chalk-mark" is read by the read head, which operation causes the production of the first examining pulse. This pulse occurs at the mid-point of the first permutable element.

The second record head is between the first record head and the read head, being about twenty milliseconds distance from the read head. A re-circulation path which takes exactly 20 milliseconds which includes the read head and the second record head is provided, and each time the "chalk-mark" element is read as 1, an examining pulse is emitted. These pulses are counted on the succeeding elements of the section allocated to the same line, and when five have been produced the operation is terminated.

Obviously any number of the lines can have examining pulses supplied in this way, the control equipment functioning for them in turn. Further, other forms of storage can be used to control the production of these pulses if required.

*Positions of the heads*

As shown in Fig. 2, the spacing from record head A, the first record head, to the read head is three-fifths of a rotation and is equivalent to 30 milliseconds of rotations, less 40 elements of surface, i.e. to 920 elements. The distance from the record head B, the second record head, to the read head is equivalent to 20 milliseconds of rotation less 4 elements of surface, i.e. to 636 elements. The record heads A and B and the read head operate in the same track.

These spacings might at first glance seem to be purely arbitrary. The reason for them will therefore be given. The start element received on the line will occur at random with respect to the position of a storage section allocated to that line. Hence in the extreme case, an incident character will just miss the first element position of one of the sections for the line concerned at the record head A. Therefore, it would have to wait while 20 time scales of four element positions each pass the record head A. These 80 element positions will take 2½ milliseconds to pass head A. In the present case that would amount to a telegraph distortion figure of 37½% which is outside practical limits.

As is well known in the telegraph art, practical limits are taken to be a distortion figure of 42%, and the optimum would, of course, be 50%.

If the distance between record head A and the read head is reduced by half the time for a group of sections to pass, i.e. by 40 element times, the longest time for recording a start condition after that condition was received is still 80 element times. That is, the delay in the recording of the start condition due to an incident character just missing a storage section allocated to the channel on which that character was received is unaltered. However, as the time between the heads is reduced by 40 element positions, the first examining pulse will occur 30 milliseconds +40 element times after the character started. In the other extreme case, that in which an incoming character just "catches" a section, the first examining pulse occurs 30 milliseconds less 40 element positions after the character commenced.

This shows that the limits of displacement are no longer 0 to 80 milliseconds, but ±40 milliseconds. This gives a telegraph distortion figure of 43¾%, which is within the stipulated 42%.

For different rotational speeds and element packings on the track the number of time scales possible per track can be calculated in the same manner but in all cases the displacement of the read head by an amount equal to half the distance moved while a group of recording section pass the head will permit more time scales than if the spacing is exactly 30 milliseconds. This is due to the fact that the range of displacement of the first examination pulse is no longer zero to a maximum of the time for the group of sections to pass the head, but is centered around zero with + or − half of that time displacement.

The interval between successive examination pulses is, as stated above, 20 milliseconds; this is provided by the circulation path already mentioned involving record head B, the track and the read head. This circulation path gives the necessary 20 milliseconds intervals and since the arrangement is to read information for the individual recording sections and then record this information, modified when necessary, it is necessary that the recorded information should be placed in a recording section allocated to the same time scale as the section which is being read. Thus the 20 milliseconds circulation path must contain an integral number of complete recording sections. In this case with an element "packing" of 1600 elements per track and with 50 milliseconds revolution time, the number of elements in 20 milliseconds is $$\frac{1600}{50}\times 20=640 \text{ elements}$$

which gives 8 repetitions of the 80 elements contained in a complete group of 20 storage sections. In the circuit arrangement considered it is necessary to store temporarily the count of the number of line examinations to enable the character stop element to be recognised. Since 3 elements of storage for each line are used for this purpose, a 3 element storage circuit is required. This storage circuit is a pattern movement register, also known as a shift register. However, when the count shows that the end of a character has been reached, the recording section for the line considered has to be wiped out. Since by this time the "chalk-mark" element, known as the ST element would have been recorded, an auxiliary head would be required for wiping out this particular element.

By the addition of a fourth unit to the pattern movement register it is possible to use the count information to amend the start element before it is re-recorded and so obviate the necessity of an auxiliary wipe out head. The intention is that as one element is read into one end of the pattern movement register the element stored at the other end is being read back into the drum store. Thus, for convenience it is preferable to have an extra position in the pattern movement register so that the counting information can be used in its stored form instead of using the information contained in one element position as it is read off and the information in two other element positions in the stored form.

In Fig. 2, such a 5-position pattern movement register has been used and is designated IR. This register may be similar to that disclosed in U.S. Patent No. 2,649,502, issued on August 18, 1953, to A. D. Odell. The 5-position pattern movement register actually provides 4 elements of the circulation circuit, which means that the spacing between record head B and the read head is reduced from 20 milliseconds to (20 milliseconds −4 elements), the total circulation time of the circuit which contains record head B, the drum track, the read head and the pattern movement register still being 20 milliseconds.

*Circuit conventions*

Before proceeding with the detailed description of Fig. 2, some explanations of the circuit conventions used therein is desirable, which circuit conventions correspond with those used in Patent No. 2,653,996, issued to E. P. G. Wright on September 29, 1953.

Electronic gates, well-known per se, are shown as circles with incoming controls shown as radial leads with arrow-heads touching the circle. Outputs are shown as radial leads with arrow-heads pointing radially outwards. The number inside the circle indicates how many of the controls must be energised for the gate to deliver an output.

A multi-stable register, e.g. 3F, is shown as a series of rectangles drawn in linear array with the larger dimension of the series vertical. Such a circuit has only one unit at a time in its operated condition and depending on circumstances any unit can operate next, rendering inoperative the previously operated unit.

A bistable circuit, also referred to herein as a flip-flop, is merely a two unit version of a multi-stable register.

A pattern movement, or shift, register is drawn as a linear array of non-contiguous rectangles joined by a line along their mid-points.

An inverter is shown as a diagonally bisected rectangle.

If the flip-flop and other circuit outputs were connected to all the gates which they control, there would be a complex network of leads which would be difficult to follow. These leads have therefore been omitted and the short control leads to the gates have been given references indicating their origin. Thus multi-stable register 3F can energise leads 3F1, 3F2 or 3F3 depending on its condition.

*Descriptions of the figures*

In Fig. 1(*a*) there are shown 80 consecutive element positions which provide the necessary 4 element positions for each of the 20 time scales. These 80 element positions are read in serial form at one point and are re-recorded at a point separate from the first. Thus there is a continuous circulation of the intelligence, if any, on the track between these two points as has already been described briefly, and a third head serves to record a start signal indication on the line, and when not performing this function performs a wiping-out function. Hence after the recording of a start element the only portion of the track which has to be considered is that which is located in the circulating circuit at any instant, i.e. that between record head B and the read head. This portion of track will contain several appearance of the group of recording sections, that is, there will be several of the individual recording sections for each line.

Considering the recording for one line, one only of these recording sections will contain pertinent intelligence at any instant during the receipt of a character on the associated line, all other appearances for this line in the circulating path being in the "0" state. This will be clearer when the circuit operation is considered. The elements marked ST are the so-called chalk-mark elements and are used to indicate whether or not a character is being received, "1" in one of these positions indicating that a start has been received on the associated line and a character is still being received and "0" indicated that no character is being received. The presence of a "1" in the ST element position is used to indicate that counting has to take place in the three following positions, shown as "1," "2" and "4." These three elements used on a binary basis give a possible count of 7, although the proposed circuit arrangement does not make use of the full count.

The waveform PS may be produced by well known means from a clock track specifically provided for this purpose. This track, which is referred to as the marker track, would have every fourth element permanently recorded as "1," all other elements being "0," so that a positive output known as a marker pulse is given corresponding to each of the ST element positions on the time scale track. TSW may be produced from PS merely by an inversion process. The separate pulse waveforms P1—P20 may be provided by PS in conjuction with a 20-position counter in an arrangement often used with cold cathode tube counting circuits. Of the last three pulse tains shown, the *t*3 pulses may be provided, in a similar manner to PS, from a clock track in which all element positions are "1," and *t*1 and *t*2 obtained from *t*3 by means of suitable delay devices. Thus two clock tracks, which involve two read heads and two amplifiers, are required. There are quite conventional and so are not shown.

In Fig. 3, 1F is a multi-stable register having three possible stable positions, each line circuit having such a register although the P pulses applied to gates 12G and 27G will be different for the individual lines. For line 1, which is the one illustrated, P1 is applied to 9G (feeding 2F from 1F1) and 12G but, for a reason to be explained shortly, P12 is applied to gate 27G. Furthermore, the line examination pulses which are obtained via 7G are given by P11 in the case of line 1. In the case of line 2, P2 would be applied to the equivalent gates 9G and 12G, P13 to the equivalent 27G and P12 to the equivalent 7G. To give one further example, for line 20, P20 would be applied to the equivalent 9G and 12G, P11 to the equivalent 27G and P10 to the equivalent 7G. The corresponding pulses for the 1F arrangements for the other lines may be deduced from the above.

The multiplicity of P waveforms used for any particular line is brought about by the fact that the portion of track between record head A and the read head does not contain an integral number of recording sections for the drum considered. With 1600 elements per track and a rotation time of 50 milliseconds there are 920 elements between these two heads that is, there are 11 complete groups of 80 elements and a further 40 elements. These 40 elements represent 10 recording sections. Thus if the start element for line 1 is recorded at record head A by a P1 pulse, this same element appears at the read head coincident with a P11 pulse. In consequence, the examination pulse for line 1, given by 7G, must be produced by P11. The contents of the storage section for line 1 will actually be completely stored in the pattern movement register 1R at a time equivalent to 4 elements later than this, i.e. P12. Since the operation of 27G takes place, in the correct circumstance, when the intelligence is so contained in 1R, this gate must be controlled by P12. Similar reasoning may be applied for the other lines, although it should be understood that other drum speeds, element packing and number of time scales per track would require suitable changes to be made to the pulses required for the various operations.

Also, in Fig. 2, 2F is a flip-flop common to the 20 lines and is used to control the recording of the commencement of a character received on any of the associated lines and also to give a wiping out control at other times. The latter is necessary to ensure that false information does not reach the read head. 3F is a common multi-stable register having 3 positions; one position is used to control the addition of "1" to a count of the number of line examinations made after the receipt of a start signal, the second position is used to cause the count to be recorded as read and the third position is to give a control of the recording current required by record head B. It will be understood that the first two positions control the binary addition of 1 in which all elements up to and including the first "0" are reversed, all elements after this being recorded as read. The third position control is used to ensure that recording current is turned on at record head B only during the counting function during the receipt of a character so that when the initial start element ST is recorded by record head A no mutilation or wiping out of this element takes place as it passes record head B.

4F is a flip-flop used for controlling the recording made by record head B. 1R, as already explained, is the pattern movement register used to store temporarily the intelligence contained in a section. The outputs of the individual positions of 1R together with the outputs from 3F are used to control the setting of 4F. 1X is an inverter which is used to ensure that a positive indication can be obtained for both states of 1R1, this being made necessary to produce the voltage controls on the various gates. Although not shown in Fig. 2, positions 2–4 of 1R also contain such inverters. It will be understood that if position 1 of 1R is energised, 1*r*1.1 will be positive and 1*r*1.0 at zero potential and conversely when position 1 of 1R is nonenergised, 1*r*1.1 will be at zero potential and 1*r*1.0 will be positive.

Fig. 4 will be explained by its use to illustrate the circuit operation which follows.

*Circuit description*

In the following circuit description line 1 only will be considered, the operation for other lines being the same with the exception of the pulses used and the sections involved. When the equipment is brought into service, a reset signal initiated, say, by a relay contact, is applied to 1G, 2G and 3G so that 1F3, 2F2, and 3F3 respectively are energised. 2F2 energised causes record head A to record "0" in all element positions, i.e. it performs a wipe out function and with 3F3 energised 3F3.0 will be at zero potential so closing 4G so that record head B will be cut off and will not record either "1" or "0." At this time no positions of 1R will be energised; since 4G is closed the condition of 4F is of no consequence. Fig. 4(*a*) shows the state of the recording at this time.

Consider that a start signal is now received on line 1. When the TSW waveform becomes positive 8G opens and position 1 of 1F is energised so that the next P1 pulse to arrive opens 9G and 10G so that the *t*1 pulse occurring during P1 opens 11G and position 1 of 2F is energised. 2F1 remains energised until the *t*1 pulse which follows when TSW becoming positive once again opens 13G and 2G, and causes position 2 of 2F to be re-energised. As a result of the energisation of 2F1 a "1" is recorded in the ST element of one of the elementary recording sections of line 1.

At time *t*2 during the P1 pulse which causes the "1" to be recorded in the ST element, 12G opens and position 2 of 1F is energised. The result of this operation is that no further "1" can be put in any other ST element associated with line 1 because one of the controls on 8G is 1*f*3 which ensures that position 1 of 1F can be energised only when the start signal is recognised and is non-energised immediately the necessary recording has been effected. The state of the recording of the storage section dealt with will now be as shown in the first column of line (*b*) of Fig. 4. Since 4G remains closed record head B cannot change this recording as it passes this station.

Approximately 30 milliseconds from the time the ST element is made "1" this element arrives at the read head where it is detected, the signal being amplified by an amplifier 1A and passed to gate 6G. The output of 6G passes to position 5 of 1R causing this position to be energised and also passes to 7G. As explained earlier, although the initial recording occurred for line 1 due to pulse P1, this same recording arrives at the read head at time P11. In consequence, 7G for line 1 is controlled by P11, and so it opens and provides an examination pulse.

This pulse is used to detect the line condition and, since it occurs 30 milliseconds from the commencement of the start signal, enables the condition of the first permutable element to be examined at the correct time, i.e. at the mid-point of that element. Hence that the condition of that element is registered as required.

At time *t*3 of P11 a stepping pulse is applied to the pattern movement register 1R which causes the contents to move one position to the right, so that position 4 will now be energised and position 5 non-energised. The remaining elements in this recording section will all be "0" so that position 5 will not be energised by any of them since there will be no output from 1A and 6G will therefore remain closed. However, the stepping pulses *t*3 will move the pattern one position as each element passes the read head, so that the *t*3 pulse coinciding with element 4 of this section will cause position 1 of 1R to be energised, positions 2, 3 and 4 being non-energised; position 5 at this time will be non-energised but it has no bearing on the operation being considered for line 1.

For the PS pulse coinciding with P12, since both 1*r*2.0 and 1*r*4.0 will be positive, 14G is open so that at time *t*1 15G will open and the lead AS will become positive. The 1*r*2.0 output is the output of the inverter controlled by unit 2 of 1R, and gives a positive output when 0 is stored in that unit. 1*r*4.0 is the output of the 1R4 inverter. Similar inverters are provided for all units of 1R although only the one for 1R1 is shown. It should be noted that 26G remains closed at this stage, this gate being intended to open only for the condition of 1R which indicates that the stop signal is being received on the line, i.e. 130 milliseconds from the commencement of the start signal.

AS is applied to position 1 of 3F which will be energised and also AS is applied to 16G causing position 1 of 4F to be energised. With position 1 of 3F energised, position 3 will be non-energised so that 3F3.0 becomes positive and 4G is opened. With 4F1 energised and 4G open record head B causes a "1" to be recorded in the element position passing the head at that time and since the circulation path contains an integral number of complete recording sections, the "1" will be recorded in a ST element in an elementary section allocated to line 1. Thus the "chalk-mark" recording in the ST element portion has been re-recorded.

The *t*3 pulse for the PS pulse at which ST is re-recorded as 1 steps the pattern so that element 1 is now contained in position 1 of 1R and since it is "0," 1*r*1.0 will be positive. Thus for the following *t*1 pulse, 17G and 18G will be open so that 19G and 16G open causing 4F1 to remain energised and 4G being open will allow a "1" to be recorded. The next *t*2 pulse will open 20G and position 2 of 3F will be energised, 3F3.0 remaining positive. Again *t*3 steps the pattern so that element 2 will now be contained by position 1 of 1R but since it is "0," 1*r*1.0 will again be positive. Thus for the next *t*1 pulse, 21G and 22G are open so that 23G will open, 4F2 will be energised and with 4G open, a "0" will be recorded for this element. Similarly the same combination will cause a "0" to be recorded for element 4 and the recording made for this elementary section will now be as shown in column 3, line (*b*) of Fig. 4. It will be noted that the third element of the storage section is designated element 2 because 2 is the numerical value of a one recording therein. Similarly the fourth element (which is the third element of the numerical portion) is designated element 4.

If the following recording section to be read by the read head, that is, one associated with line 2, has a "0" in the ST element position the PS pulse which follows will open 5G causing 3F3 to be energised and, in consequence, 4G will be closed. Alternatively if there is a "1" in this element AS becomes positive and 3F1 will be re-energised to deal with the addition of one for this section.

Approximately 20 milliseconds after the first recording passes the read head it arrives at record head A. Here because 1F2 is energised, when this occurs, 2F2 will be energised and the original recording will be wiped out. At the same time the recording made by record head B arrives at the read head, this recording being as shown in column 2, line (*c*) of Fig. 4. Again the fact that there is a "1" in the ST element causes an output from 6G so that 7G will open and give an examination pulse which will be 50 milliseconds from the beginning of the start signal and so is used to detect the second permutable element. Again the intelligence from the recording section passes to 1R but this time positions 1 and 2 will be energised and positions 3 and 4 will be non-energised. The PS pulse coinciding with P12 will again open 15G at time *t*1 as 14G is opened by 1*r*4.0, and 3F1 will be energised and 16G opened to energise 4*f*1. The result of these events is that 4G opens and again a "1" is recorded in the ST element position for line 1. The *t*3 pulse steps the pattern in IR so that position 1 will now contain element 1 and since this is "1," position 1 will be energised and 1*r*1.1 will be positive. In consequence, the next *t*1 pulse will open 23G for 24G and 22G will be open and 4F2 will be energised to cause a "0" to be recorded via 4G. In this cycle the next *t*2 pulse cannot open 20G to cause position 2 of 3F to be energised. However, the next *t*3 pulse steps element 2 into position 1 of 1R and since this element is "0," 1*r*1.0 will be positive. Thus the next *t*1 pulse will cause 19G and 16G to open, because 17G and 18G will be open, 4F1 will be energised and a "1" will be recorded in element 2. This time the *t*2 pulse opens 20G and 3F2 is energised so that element 4 will be recorded as "0" by 21G, 22G and 23G causing 4F2 to be energised. The state of the recording will now be as shown in column 2, line (*c*) of Fig. 4.

In the next three circulation cycles, the recordings received at the read head will be as shown in column 2, lines (*d*), (*e*) and (*f*) in Fig. 4, which as indicated are received at 70, 90 and 110 milliseconds respectively from the commencement of the start signal on line 1. Line examination pulses which will be for the third, fourth and fifth permutable elements will be produced by 7G and the modification to the intelligence stored in the recording section will be made by the circuit in a similar manner to the description given for the first two circulation cycles. The recordings made by record head B will be as shown in column 3, lines (*d*), (*e*) and (*f*) of Fig. 4.

The recording made by record head B shown in column 3, line (*f*) of Fig. 4 will appear at the read head 20 milliseconds later, that is, 130 milliseconds from the commencement of the start signal and it will be understood that with 50 baud transmission this time occurs in the stop period of the received teleprinter character. As previously described, during P11 a line examination pulse is produced at time *t*1 by means of 6G and 7G and at the same time position 5 of 1R is energised. At time *t*3 the stepping pulse causes the pattern to move one position to the right so that now position 4 of 1R will be energised by the ST element. The remaining elements of the elementary recording section for line 1 are received by 1R and stepped each time; when the *t*3 pulse occurs for element 4 the recording will be contained by positions 1–4 of 1R and, in accordance with the received recording shown in column 2, line (*g*) of Fig. 4, 1*r*1.1, 1*r*2.1, 1*r*3.0 and 1*r*4.1 will be positive. 14G can no longer open so that the PS pulse coinciding with P12 cannot open 15G and lead AS remains at zero potential. However, 26G is opened by this combination, the result being that lead ES now becomes positive. ES is applied to 3G so that position 3 of 3F is energised, irrespective of the position in which it had been left by the previous recording section, and 3F3.0 will be at zero potential which closes 4G so that record head B will be unable to record. 3F will remain in this state at least for the remainder of this recording section so that record head B cannot cause any recording and since, as previously explained, record head A is at this time performing a wipe out function for line 1 recording sections the new recording will be all "0" as shown in column 3, line (*g*) of Fig. 4 and until a new character is received on line 1 this condition will continue. The state of 4F during these events is of no consequence although a gate could be added, if necessary, to cause it to be energised as required. The condition of the ES lead is also applied to 27G so that this gate opens causing position 3 of 1F to be energised. For the stop condition on the line 8G cannot open, hence the circuit will remain in this state awaiting the next start signal of the next character.

Gate 4G is shown as a voltage control gate but it should be understood that this is merely for illustration since control 3F3.0 would be used to turn on current as necessary into the record head as described in the co-pending application Ser. No. 417,071, filed March 18, 1954.

*Transmitting time scale*

The arrangement according to the invention is applicable to the production of time scales for controlling the transmission of a recorded character. In explaining this briefly it will first be assumed that transmission is in a seven unit code.

Since the transmission can start when it is most convenient the record head A is omitted, the only heads needed being the read head and the record head B. When a character is to be retransmitted on a line, a pulse is recorded in the ST element position of a recording section for that line. This can be effected in the same manner as when the character is being received. Thereafter a control pulse is emitted every 20 milliseconds, the counting occurring on the track as already described.

In certain systems it is desirable to transmit in a 7½ unit code: in this case operation is similar except that the circulation path is a 10 millisecond path, the only control pulses used being those at the beginnings of the code elements.

While the principles of the invention have been described above in connection with specific embodiments, and particular modifications thereof, it is to be clearly understood that this description is made only by way of example and not as a limitation on the scope of the invention.

What we claim is:

1. Apparatus for measuring a succession of time intervals comprising a storage device having tracks, a recording device and a reading device mounted adjacent said storage device in operative relation to a common track, a re-recording device mounted intermediate said recording and reading devices operative on the same track, means for moving the storage device past said devices in turn at a substantially uniform speed, means for causing the recording device initially to insert a mark in said storage device after which at a predetermined time interval, said reading device detects said mark, means operated by said reading device both for producing a time signal and for causing the re-recording device to record a further mark, and means responsive to the detection of a mark by said reading device and the recording of a mark by said re-recording device a desired number of times for disabling said re-recording device at the time a further mark is to be recorded.

2. Apparatus, as claimed in claim 1, and in which the means responsive to the operation of the reading and recording devices for a desired number of times comprises means for causing said time signals to be counted, means for recording the count in said storage device, and means under control of said count as read by said reading device for preventing further re-recording when said desired number of time signals have been produced.

3. Apparatus, as claimed in claim 2, in which the counting means records said count in binary digital notation in said storage device, and in which the means for recording the count in said storage device operates when a time signal is produced to record the count after the addition thereto of one.

4. Apparatus, as claimed in claim 3, in which the reading device and the re-recording device which records said further mark are separated by a distance which the storage device traverses in a time *t*, which time *t* is equal to said time interval less the time taken for said storage device to traverse a distance equal to that length of said storage device in which *x* binary digits may be stored, and which comprises a pattern movement register having *x* units in each of which a binary digit may be stored, an input circuit for said pattern movement register from said reading means, means for progressing the digits in said register at the same rate as the digits stored in said storage device pass said reading means, an output circuit from said register to the recording means which records said further mark, means for examining the count of said time intervals while said count is in said register, and the disabling means comprises means under control of said examining means for preventing said re-recording when said desired number of time intervals have been measured.

5. Apparatus, as claimed in claim 1 in which said storage device provides a number of separate sections which are individually allocated to a number of users, the arrangement being such that when a mark is read off a storage section allocated to one of said users said further mark is recorded in a storage section allocated to the same user, said apparatus further comprising a scanner for scanning said users in search of an indication that one of said users requires a plurality of successive time intervals to be measured, means controlled by said scanner for connecting the recording device which inserts said initial mark into operative relation with a storage section allocated to a user when that section is being scanned, means in said scanner responsive to the detection of an indication that a user requires said measurement for inserting a mark in a storage section allocated to that user, whereby when said reading device detects a mark, a time signal is produced for the user from whose storage section that mark was read and a further mark is recorded in a storage section allocated to the same user, the disabling means including means for simultaneously counting the reading and recording of further marks for a plurality of users.

6. Apparatus for measuring at the same time a succession of time intervals for any one of a number of users, comprising a storage device having magnetic tracks, recording and reading devices mounted adjacent said storage device in operative relation to a common track, means for moving said storage device past said recording and reading devices in turn at a substantially uniform speed, said storage device providing a number of storage sections each of which is allocated to one of said users, means for producing a signal characteristic of a user when said user requires said measurement, means responsive to said signal to cause a recording device to insert a mark in a storage section allocated to said corresponding user, means responsive to said reading device for detecting said mark, means responsive to said detecting means for producing a time signal for the user in whose storage section that mark was recorded and for causing a further mark to be recorded by a recording device in a storage section allocated to the same user, means for measuring a desired number of time intervals for said reading and recording for a user, and means responsive to said measuring means for disabling said last-mentioned recording device when said desired number of time intervals have been measured, whereby the measurement of a succession of time intervals can be in progress for a plurality of users at the same time.

7. Apparatus, as claimed in claim 6, wherein there